UNITED STATES PATENT OFFICE.

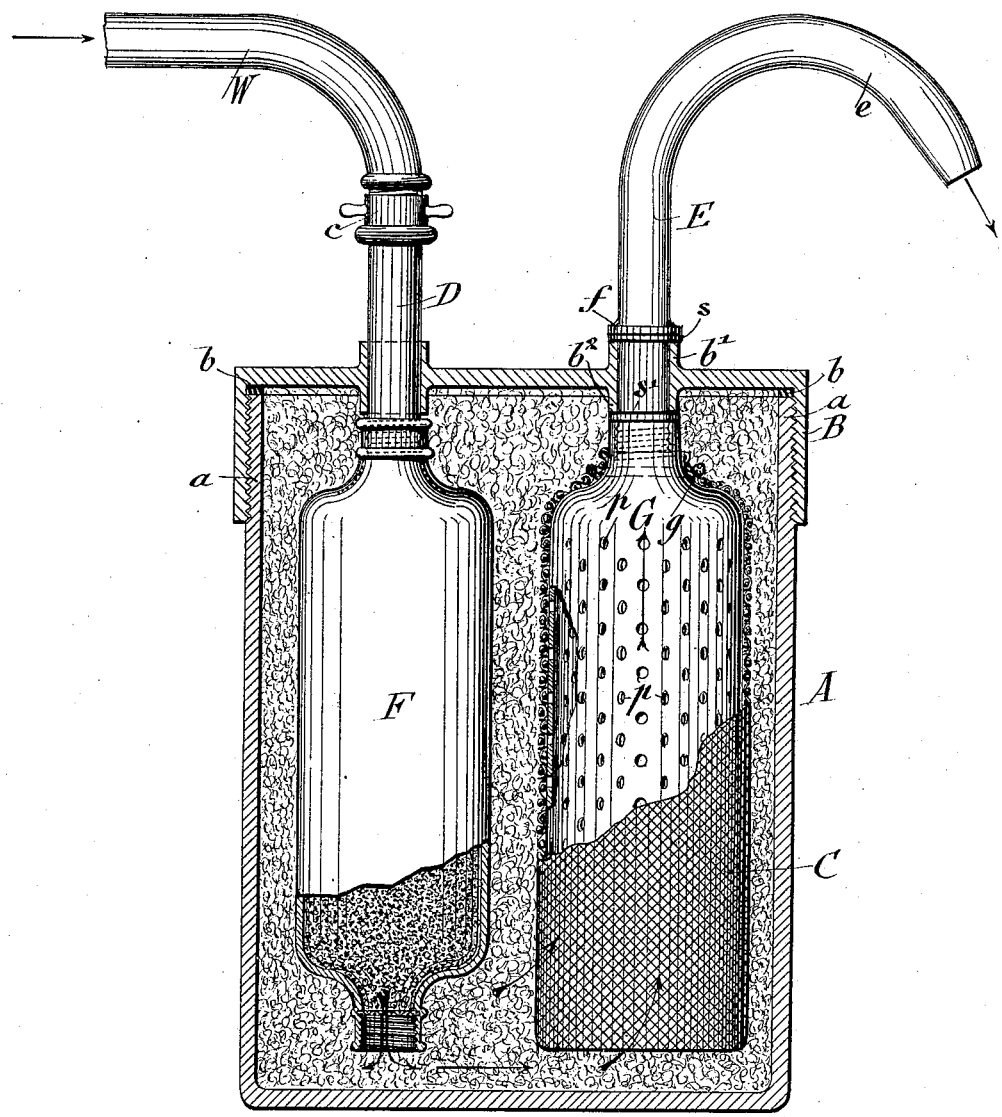

RUDOLF HELWIG, OF NEW YORK, N. Y.

FILTERING APPARATUS.

SPECIFICATION forming part of Letters Patent No. 620,451, dated February 28, 1899.

Application filed November 19, 1898. Serial No. 696,856. (No model.)

*To all whom it may concern:*

Be it known that I, RUDOLF HELWIG, a citizen of Germany, residing in the city of New York, in the borough of Manhattan and State of New York, have invented certain new and useful Improvements in Filtering Apparatus, of which the following is a specification.

This invention relates to improvements in apparatus for filtering water or other liquids; and the object of the invention is to provide a filter convenient for use when attached directly to the ordinary water-faucet which is simple in construction and which may be readily taken apart for cleaning.

The invention consists of a filtering apparatus comprising an exterior chamber containing a fibrous filtering material and provided at its open end with a removable cap, an inlet-pipe and an outlet-pipe passing through said cap, an interior filtering-chamber attached to the inner end of the inlet-pipe, and a strainer attached to the inner end of the outlet-pipe; and the invention consists, further, of a filtering apparatus comprising an exterior chamber containing filtering material and provided at its open end with a removable cap, an inlet-pipe passing through said cap, an outlet-pipe passing through said cap, an interior filtering-chamber attached to the inner end of the inlet-pipe, and a strainer attached to the inner end of the outlet-pipe and composed of a perforated cylinder and an envelop of suitable fabric upon said cylinder, as will be fully described hereinafter and finally pointed out in the claims.

Referring to the accompanying drawing, which shows my improved filtering apparatus partly in vertical central section, A represents the exterior chamber of the apparatus, said chamber being provided at its upper open end with a screw-threaded portion $a$. The material of which this exterior chamber or receptacle A is made may be either metal, glass, or porcelain, and it may be ornamented upon the outside, or plain. Upon the chamber A is screwed a metal cover or cap B, through which pass the metal inlet-tube D and outlet-tube E. A rubber washer or gasket $b$ may be used between the top of the chamber A and the cap B to secure a perfectly tight connection. To the inner end of the inlet-tube D is attached a common filter F, which is preferably of cylindrical shape and which contains asbestos, charcoal, bone-black, or other filtering material, as indicated in the drawing. At its outer end the said tube D is provided with a coupling $c$ for connecting the apparatus to an ordinary water-faucet W or other source of supply. To the inner end of the outlet-tube E is attached a strainer G, the same consisting of a cylindrical metal tube closed at the lower end and provided with a number of perforations $p$ for permitting the passage of the filtered liquid. At its outer end the outlet-tube E is curved to form a spout $e$ for discharging the filtered liquid in downward direction. The inlet-tube D is preferably fixed immovably in the cap B. The outlet-tube E, however, is swiveled in the cap B, so that the discharged stream may be directed as desired. For this purpose the tube E is provided with a flange $f$ and the cap B with the flanges $b'$ and $b^2$. Rubber or leather washers $s\ s'$ may be interposed between the flanges $f$ and $b'$ and between the flange $b^2$ and top of the strainer G. The outlet-tube E is screwed at its inner end directly into the upper contracted end of the strainer; but it is obvious that other methods of connection may be employed and that the filtering apparatus may be made up for sale with either one or both of the tubes D and E swiveled in the cap B or fixed immovably in the same.

To use the filtering apparatus, the cap B is unscrewed from the chamber A and a quantity of cellulose or other fibrous material, preferably possessing highly absorbent qualities, placed in the same. The cap is then screwed on and the water-supply opened. The liquid flows first through the filter F, where the chemical impurities are removed, and is discharged into the cellulose in the chamber. The fiber swells and forms a superior filtering medium, the passing liquid being forced between the fine fibers and the fine dirt and grit and similar mechanical impurities retained in the cellulose which were not retarded by the asbestos, bone-black, or other material in the filter F. To prevent the cellulose fibers being forced through the perforations in the strainer and carried away by the discharged liquid, an envelop C, of any suitable fabric, such as a loosely woven or knitted textile fabric, is drawn upon the strainer and, if necessary, may be tied thereon by a cord g at the upper contracted portion of the strainer. The filtered liquid passes easily through the fabric, through the perforations into the interior of the strainer, and is discharged from the spout. The passage of the liquid through the apparatus is indicated by arrows throughout the drawing.

When the cellulose becomes filled with impurities, to replace it with new it is not necessary to disconnect the apparatus from the water-supply; but the chamber A may be bodily unscrewed from the cap B, the old cellulose removed, and a new supply placed in the chamber and the same screwed in the cap. If it is desired to clean the filter F, the same may be reversed and the liquid allowed to flow through it for a short time before replacing the chamber A in the cap.

My improved filtering apparatus forms a cheap and effective filter for domestic use or for special purposes. The cellulose is not expensive and the renewal of the same in the apparatus is a simple and quick operation.

Having thus described my invention, I claim as new and desire to secure by Letters Patent—

1. A filtering apparatus, consisting of an exterior chamber containing a fibrous filtering material and provided at its open end with a removable cap, an inlet-pipe and an outlet-pipe passing through said cap, an interior filtering-chamber attached to the inner end of the inlet-pipe, and a strainer attached to the inner end of the outlet-pipe, substantially as set forth.

2. A filtering apparatus, consisting of an exterior chamber containing filtering material and provided at its open end with a removable cap, an inlet-pipe passing through said cap, an outlet-pipe passing through said cap, an interior filtering-chamber attached to the inner end of the inlet-pipe, a strainer attached to the inner end of the outlet-pipe and composed of a perforated cylinder, and an envelop of suitable fabric upon said cylinder, substantially as set forth.

In testimony that I claim the foregoing as my invention I have signed my name in presence of two subscribing witnesses.

RUDOLF HELWIG.

Witnesses:
M. H. WURTZEL,
PAUL GOEPEL.